(12) United States Patent
Zheng et al.

(10) Patent No.: US 9,783,304 B2
(45) Date of Patent: Oct. 10, 2017

(54) HEADREST STRUCTURE, HEADREST CUSHION AND PASSENGER SEAT

(71) Applicants: SINGAPORE TECHNOLOGIES AEROSPACE LTD, Paya Lebar (SG); TENRYU AERO COMPONENT CO., LTD., Kakamigahara, Gifu (JP)

(72) Inventors: Guo Ying Zheng, Paya Lebar (SG); Siang Ann Cheng, Paya Lebar (SG); Teruo Sawada, Kakamigahara (JP)

(73) Assignees: Singapore Technologies Aerospace Ltd., Paya Lebar (SG); Tenryu Aero Component Co., Ltd., Kakamigahara, Gifu (JP)

( * ) Notice: Subject to any disclaimer, the term of this patent is extended or adjusted under 35 U.S.C. 154(b) by 0 days.

(21) Appl. No.: 14/782,286

(22) PCT Filed: Apr. 8, 2014

(86) PCT No.: PCT/SG2014/000155
§ 371 (c)(1),
(2) Date: Oct. 2, 2015

(87) PCT Pub. No.: WO2014/168583
PCT Pub. Date: Oct. 16, 2014

(65) Prior Publication Data
US 2016/0023767 A1    Jan. 28, 2016

(30) Foreign Application Priority Data
Apr. 8, 2013 (SG) .............................. 201302619-0

(51) Int. Cl.
*A47C 7/36*  (2006.01)
*A47C 7/38*  (2006.01)
(Continued)

(52) U.S. Cl.
CPC .......... *B64D 11/0642* (2014.12); *B60N 2/485* (2013.01); *B60N 2/4808* (2013.01);
(Continued)

(58) Field of Classification Search
CPC .... B60N 2/485; B60N 2/4808; B60N 2/4882; B60N 2/4838; B60N 2002/4888; B60N 2002/4891; B64D 11/0642; B64D 11/0647
(Continued)

(56) References Cited

U.S. PATENT DOCUMENTS 2,464,435 A * 3/1949 Conradt ............... B60N 2/4879
297/397
2,719,577 A * 10/1955 Eyman ................... A47C 7/383
297/398 X
(Continued)

FOREIGN PATENT DOCUMENTS

AT  506 239 A1  7/2009
DE  39 28 884 A1  3/1991
(Continued)

OTHER PUBLICATIONS

International Search Report for corresponding International Application No. PCT/SG2014/000155, mailed Jun. 5, 2014, 4pp.
(Continued)

*Primary Examiner* — Rodney B White
(74) *Attorney, Agent, or Firm* — Lewis Roca Rothgerber Christie LLP

(57) ABSTRACT

A headrest structure for a passenger seat, a headrest cushion and passenger seat. The headrest structure comprises an adjustable headrest frame for connection to a passenger seat; and a headrest cushion mounted to the adjustable headrest frame such that the headrest cushion is moveable relative to a seat back of the passenger seat by way of the adjustable
(Continued)

headrest frame; wherein the headrest cushion comprises a support surface facing away from the headrest frame, the support surface comprising a concave upper part and a convex bottom part relative to the passenger seat.

13 Claims, 4 Drawing Sheets

(51) Int. Cl.
 *B64D 11/06* (2006.01)
 *B60N 2/48* (2006.01)
(52) U.S. Cl.
 CPC ......... *B60N 2/4838* (2013.01); *B60N 2/4882* (2013.01); *B64D 11/0647* (2014.12); *B60N 2002/4888* (2013.01); *B60N 2002/4891* (2013.01)
(58) Field of Classification Search
 USPC .................... 297/391, 397, 398, 406, 452.27
 See application file for complete search history.

(56) References Cited

U.S. PATENT DOCUMENTS

| | | | |
|---|---|---|---|
| 4,268,557 A | 5/1981 | Bracesco | |
| 4,738,488 A | 4/1988 | Camelio | |
| 4,797,934 A * | 1/1989 | Hufnagel | A47C 7/383 297/398 X |
| 4,856,848 A | 8/1989 | O'Sullivan et al. | |
| 5,622,405 A | 4/1997 | Pitencel | |
| 6,123,389 A * | 9/2000 | O'Connor | A47C 7/383 297/397 |
| 6,135,560 A | 10/2000 | Fagg | |
| 6,250,716 B1 | 6/2001 | Clough | |
| 6,305,749 B1 * | 10/2001 | O'Connor | A47C 7/383 297/397 |
| 6,601,804 B2 * | 8/2003 | Bisch | A47C 7/383 297/397 X |
| 6,962,392 B2 | 11/2005 | O'Connor | |
| 7,080,886 B2 * | 7/2006 | Bauer | A47C 7/38 297/397 X |
| 7,213,884 B2 * | 5/2007 | Flory | B60N 2/4882 297/397 X |
| 7,445,281 B2 * | 11/2008 | Kassai | A47D 15/008 297/391 X |
| 7,500,721 B2 * | 3/2009 | Beroth | B60N 2/482 297/406 |
| 8,911,020 B2 * | 12/2014 | Westerink | B64D 11/06 297/406 |
| 9,028,000 B2 * | 5/2015 | Millan | B60N 2/4808 297/406 X |
| 2001/0040401 A1 * | 11/2001 | Lin | A47C 7/383 297/397 |
| 2002/0043860 A1 | 4/2002 | Dinkel et al. | |
| 2004/0007910 A1 * | 1/2004 | Skelly | A47C 7/38 297/406 |
| 2004/0217639 A1 | 11/2004 | Clough | |
| 2008/0315657 A1 | 12/2008 | Beroth et al. | |
| 2010/0060066 A1 * | 3/2010 | Hojnacki | B60N 2/48 297/391 |
| 2010/0117430 A1 * | 5/2010 | Moeseneder | B60N 2/0284 297/391 |
| 2013/0076086 A1 * | 3/2013 | Pickett | B60N 2/48 297/391 X |
| 2013/0278027 A1 * | 10/2013 | Brucato | B60N 2/4805 297/397 X |
| 2016/0068086 A1 * | 3/2016 | Gazit | B60N 2/4879 297/397 X |

FOREIGN PATENT DOCUMENTS

| | | |
|---|---|---|
| DE | 101 13 091 A1 | 10/2002 |
| DE | 10 2004 058788 A1 | 6/2006 |
| EP | 1 134 114 A2 | 9/2001 |
| FR | 2 877 887 A1 | 5/2006 |
| FR | 2 898 308 A1 | 9/2007 |
| SE | 432 519 B | 4/1984 |
| WO | WO 2005/009782 A1 | 2/2005 |
| WO | WO 2012/135245 A2 | 10/2012 |

OTHER PUBLICATIONS

International Preliminary Report on Patentability for corresponding International Application No. PCT/SG2014/000155, completed Aug. 6, 2015, 6pp.
Office action issued Oct. 10, 2016 in corresponding CN Patent Application No. 201480032202.2 including Eng. Translation, 14pp.

* cited by examiner a)

b)

HEADREST STRUCTURE, HEADREST CUSHION AND PASSENGER SEAT

CROSS-REFERENCE TO RELATED APPLICATIONS

This application is a national phase application under 35 U.S.C. §371 of International Application No. PCT/SG2014/000155, filed on Apr. 8, 2014, which claims priority to Singapore Patent Application No. 20 1302619-0, filed Apr. 8, 2013, the disclosures of which are incorporated herein by reference in their entirety.

FIELD OF INVENTION

The present invention relates broadly to a headrest structure, a headrest cushion and to passenger seat

BACKGROUND

Headrests are commonly used on passenger seats, for example aircraft passenger seats, to provide support for the head of the seat occupant. To be effective, the headrest should be positioned at a correct distance above the backrest of the seat. The distance above the backrest will defer from person to person depending on the anthropometry and comfort preference of an individual.

A conventional headrest for aircraft seating is a 2-way headrest where the seat occupant can adjust the headrest to be positioned to the correct distance above the backrest based on individual comfort and preference by upward and downward movement. To try and address issues encountered by the conventional 2-way headrest, a 4 and a 6-way headrest have been developed.

The 4-way headrest, in addition to allowing upward and downward adjustment, allows its sides to be folded to provide sideway head support for the seat occupant.

In addition to the function described above for the 4-way headrest, the 6-way headrest provides forward and backward tilting of the headrest. As such a 6-way headrest offers the seat occupant a wide range of headrest adjustment based on individual preference.

In existing headrest designs, the headrest cushion is typically shaped with a substantially flat support surface, i.e. the surface facing away from the headrest frame and towards the head of the seat occupant, to provide support for the head of the seat occupant. It has been found that strain and stiff neck continue to be experienced by many passengers, especially for long haul flight where seat occupant typically tilt their head sideways while sleeping. As such, comfort of passenger seating is compromised.

Embodiments of the present invention provide a headrest, a cushion for a head rest and a passenger seat that seek to address at least one of the above problems.

SUMMARY

In accordance with a first aspect of the present invention, there is provided a headrest structure for a passenger seat, the headrest structure comprising an adjustable headrest frame for connection to a passenger seat; and a headrest cushion mounted to the adjustable headrest frame such that the headrest cushion is moveable relative to a seat back of the passenger seat by way of the adjustable headrest frame; wherein the headrest cushion comprises a support surface facing away from the headrest frame, the support surface comprising a concave upper part and a convex bottom part relative to the passenger seat.

In accordance with a second aspect of the present invention, there is provided a headrest cushion for an adjustable headrest frame for a passenger seat, the headrest cushion being configured for mounting to the adjustable headrest frame such that the headrest cushion is moveable relative to a seat back of the passenger seat by way of the adjustable headrest frame, and wherein the headrest cushion comprises a support surface disposed for facing away from the headrest frame, the support surface comprising a concave upper part and a convex bottom part relative to the passenger seat.

In accordance with a third aspect of the present invention, there is provided a passenger seat comprising a headrest structure of the first aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

An embodiment of the present invention provides a 6 way headrest coupled with a tear drop shaped cushion. The 6 way headrest allows the seat occupant to adjust the headrest to their preferred configuration while the headrest cushion has a support surface with a concave upper part and a convex bottom part relative to the passenger seat, which preferably provides both head and neck support.

In an example embodiment, the shape of the headrest cushion is designed to account for the anatomy of the human head and neck, more particular, the cushion has a concave top half and a convex bottom half which follows the posterior outline of human head and neck region. Advantageously, the concave top half provides support for the head, while the convex bottom half provides support for the seat occupant's neck.

Figure 1:
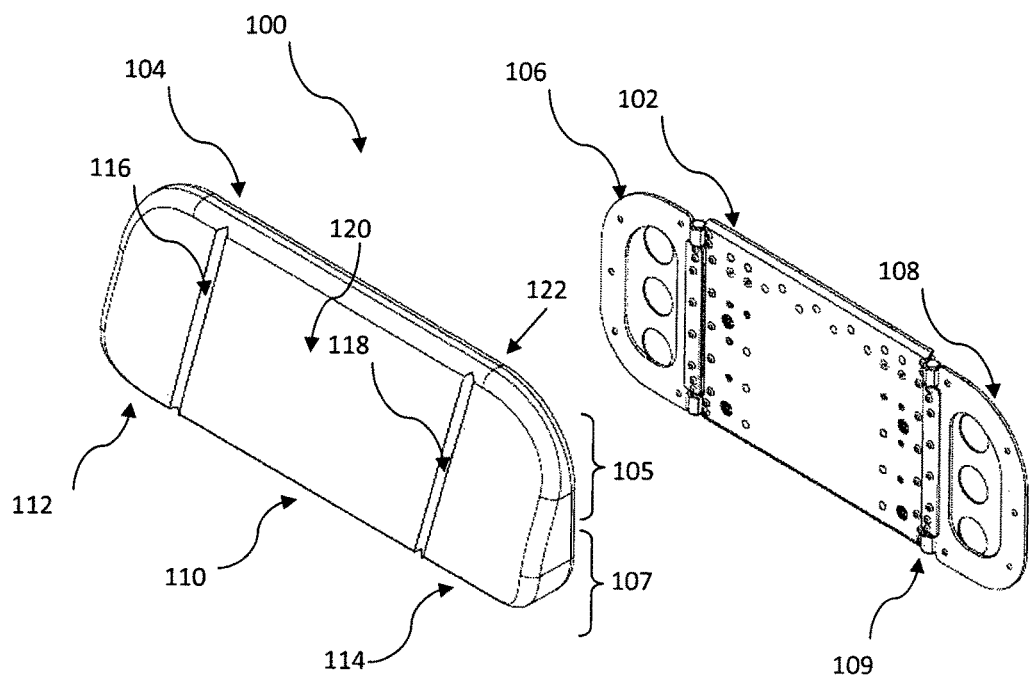
FIG. 1a) shows a schematic exploded isometric view of a headrest structure according to an example embodiment.
FIG. 1b) shows a schematic side view of the headrest structure of FIG. 1.
Figure 1:
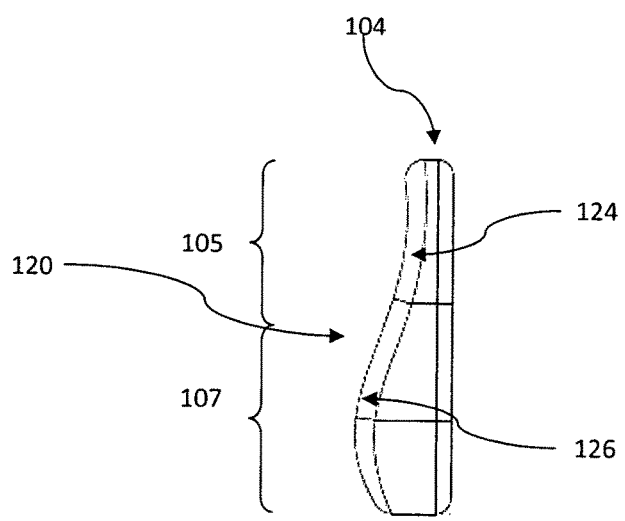

FIG. 1a) shows a schematic exploded isometric view of a headrest 100 according to an example embodiment. The headrest 100 allows upward, downward adjustments, forward tilt, backward tilt and folding along tow fold lines. The headrest 100 comprises a headrest frame 102 and a headrest cushion 104. With the 6-way headrest frame 102 and the shaped cushion 104, the example embodiment is preferably capable of providing both head and neck support for a wide range of seat occupants with different anthropometry. The folding of the headrest frame side flaps 106, 108 by way of hinges e.g. 109 can also advantageously provide support to the head and the neck region against or to limit sideway tilting of the head.

In the example embodiment, the headrest cushion 104 has a concave upper portion 105 and a convex bottom portion 107. Furthermore, the headrest cushion 106 in this embodiment has a softer material or materials in the center portion 110 and a stiffer material or materials at the side flap portions 112, 114. This can advantageously provide the seat occupant a comfortable feel at the posterior head and neck regions while providing adequate support to the head and neck regions against or to limit sideway tilting of the head by way of the stiffer material or materials at the side flap portions. In one embodiment, for the center portion 110 of the headrest cushion 104, memory foam is preferably implemented to enhance the conformity of the headrest to individual occupant's anthropometry.

The headrest cushion 104 in the example embodiment has voids in the form of substantially V-shaped cutouts 116, 118 formed in a support surface 120 thereof, which faces away from the headrest frame 102, i.e. towards a seat occupant, to accommodate folding of the side flap portions 112, 114, together with the side flaps 106, 108. Preferably, the cutouts 116, 118 will eliminate or at least reduce "wrinkle" on the headrest cushion when the side flaps 106, 108 are folded. The voids are not limited to the cutouts 116, 118 shown in FIG. 1, but may additionally or alternatively be differently shaped, may extend continuously or, discontinuously, may be partially or fully buried in the foam body, and/or may be formed in the surface 122 facing the headrest frame 102 in different embodiments. Forming the voids in the support surface 120 may be preferred for minimizing wrinkles.

With reference to FIG. 1b), in this embodiment, the concave top portion 105 of the support surface 120 directly meets the convex bottom portion 107 of the support surface 120 such that a cross-section of the headrest cushion along the vertical axis relative to the passenger seat is substantially reverse S-shaped. The curvature 124 of the concave upper portion 105 is shallower than the curvature 126 of the convex lower portion 107. The concave top portion 105 and the convex bottom portion 107 each extend substantially across the horizontal width of the headrest cushion 104 relative to the passenger seat.

Figure 2:
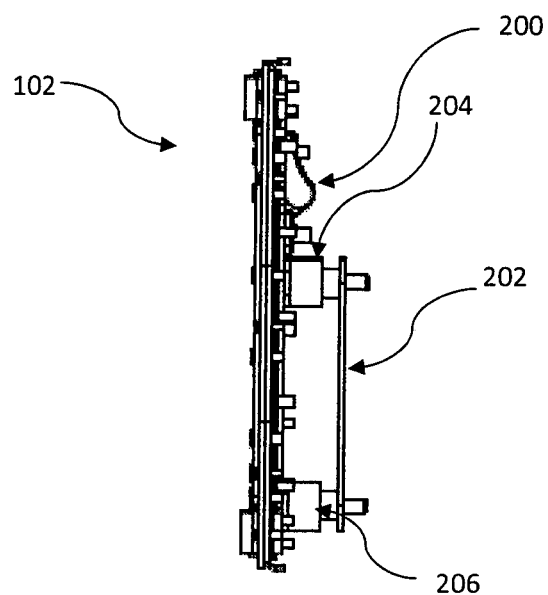
FIGS. 2a) and b) shows schematic side views of the headrest frame of the headrest structure of FIG. 1, in different respective tilt orientations.
Figure 2:
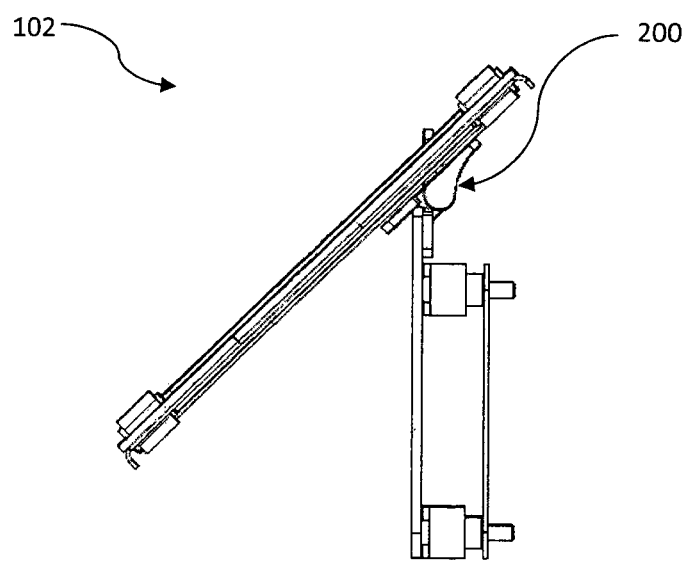

With reference to FIGS. 2a) and b), the forward and backward tilting of the headrest frame 102 around the hinge 200 in the example embodiment advantageously allows the seat occupant to adjust the position of the headrest cushion 104 (FIG. 1) to fit to the concave outline of the posterior of the neck and optionally to fit to the convex outline of the back of the head, thus providing specific neck and head support. The hinge 200 is configured in this embodiment to create an axis of rotation along about the top ¼ of the height of the headrest frame 102. The tilting angle of the headrest frame 102 can be, but is not limited to, between about 0° to about 90° from vertical (with reference to the seat back in a substantially upright position). A mounting brace 202 is provided for mounting the headrest frame 102 to the seat back of a passenger seat. Moveable blocks 204, 206 are guided in tracks (hidden in FIG. 2) formed on the back of the headrest frame 102 for adjustment in upward and downward directions.

Figure 3:
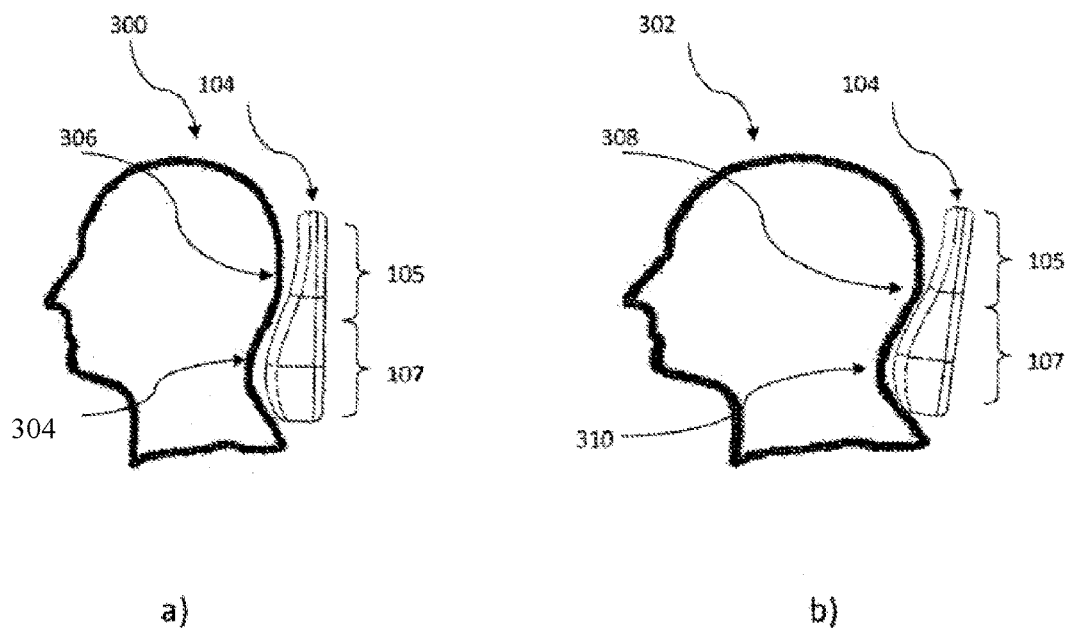
FIGS. 3a) and b) show schematic side views of the headrest cushion of the headrest structure of FIG. 1 in respective different tilt orientations.

FIGS. 3a) and b) illustrate the headrest cushion 104 in two different tilt orientations to fit two heads 300, 302 with different anthropometry, i.e. a shallower and a steeper neck curvature respectively. In FIG. 3a), the headrest cushion 104 can be adjusted such that the lower convex portion 107 extends into and fits the concave neck outline 304, while the concave upper portion 105 "cradles" the convex outline 306 of the back of the head 300. Similarly, in FIG. 3b), the headrest cushion 104 can be adjusted such that the lower convex portion 107 extends into and fits the steeper convex concave neck outline 310, while the concave upper portion 105 "cradles" the convex outline 308 of the back of the head 302.

As can be seen from FIGS. 3a) and b), the 6 way headrest 100 (FIG. 1) of the example embodiment allows the seat occupant to adjust the headrest configuration to provide support for the head and neck based on their comfort preference and anthropometry, which can advantageously achieve improved comfort for the occupant.

Figure 4:
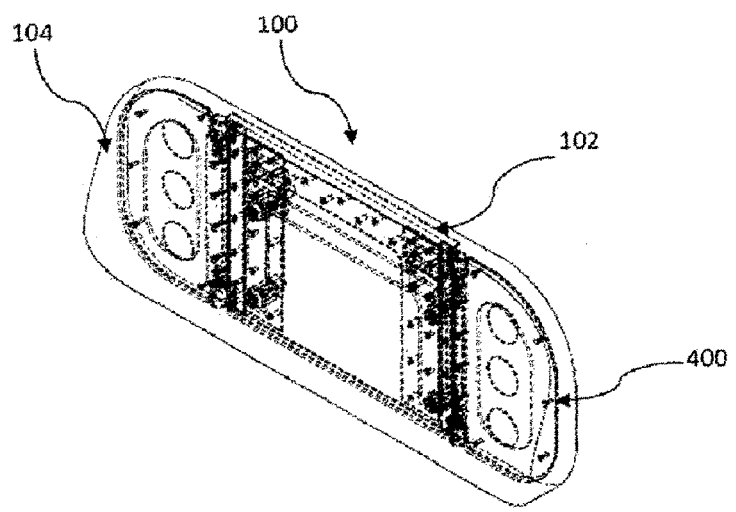
FIG. 4 shows a schematic isometric view of the headrest structure of FIG. 1.

FIG. 4 shows a schematic isometric view of the headrest 100 with the headrest cushion 104 mounted to the headrest frame 102 using, for example, Velcro and/or a number of rivets e.g. 400 in this example embodiment, with a transparent view through the headrest cushion 104.

Figure 5:
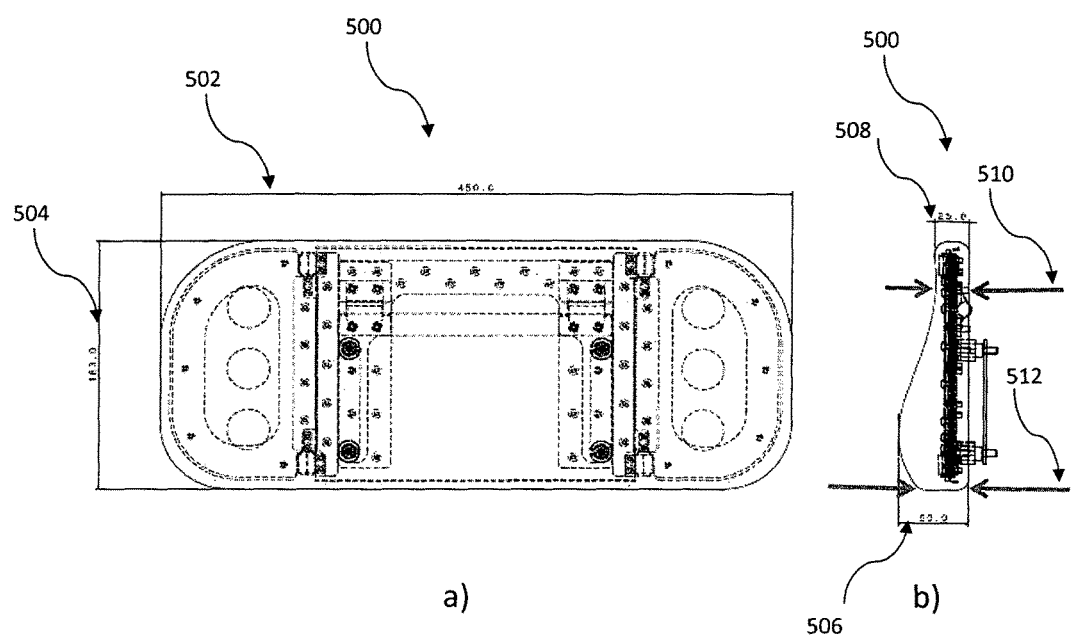
FIGS. 5a) and b) show schematic front and side views respectively of the headrest structure of FIG. 1.

In different embodiment, the dimensions of the headrest structure and cushion depend on the dimensions and aesthetics of the seat, as will be appreciated by a person skilled in the art. As illustrated in FIGS. 5a) and b), one example implementation of a 6-way headrest 500 can have the following dimensions:
- width 502 about 450 mm
- height 504 about 183 mm
- maximum depth 506 about 55 mm
- depth 508 at top about 25 mm
- minimum depth 510 in upper concave portion about 15 mm
- depth 512 at the bottom about 40 mm In one embodiment, a headrest structure for a passenger seat comprises an adjustable headrest frame for connection to a passenger seat; and a headrest cushion mounted to the adjustable headrest frame such that the headrest cushion is moveable relative to a seat back of the passenger seat by way of the adjustable headrest frame; wherein the headrest cushion comprises a support surface facing away from the headrest frame, the support surface comprising a concave upper part a convex bottom part relative to the passenger seat.

The headrest cushion can comprise voids formed in a body thereof, the voids being aligned with respective folding joints of the adjustable headrest frame for folding side portions of the headrest frames relative to a mid-portion of the headrest frame. The headrest cushion can comprise a mid-portion having a first compressive strength, and side portions having a second compressive strength different from the first compressive strength. The first compressive strength can be higher than the second compressive strength. The mid-portion of the headrest cushion can be mounted to a center mounting plate of the adjustable headrest frame. The side portions of the headrest cushion can be mounted to respective side mounting plates of the adjustable headrest frame.

In one embodiment, the concave upper part of the support surface directly meets the convex bottom part of the support surface such that a cross-section of the headrest cushion along a vertical axis relative to the passenger seat is substantially reverse S-shaped. The curvature of the concave upper part is shallower than the curvature of the convex lower part.

In one embodiment, the concave upper part and the convex bottom part each extend substantially across the horizontal width of the headrest cushion relative to the passenger seat.

The adjustable headrest frame can comprise a 4-way headrest frame. The adjustable headrest frame can comprise a 6-way headrest frame. The headrest frame can be configured such that the headrest cushion is moveable in upward and downward directions, in forward and backward tilt, and folding along two fold lines.

In one embodiment, a headrest cushion for an adjustable headrest frame for a passenger seat is provided, the headrest cushion being configured for mounting to the adjustable headrest frame such that the headrest cushion is moveable relative to a seat back of the passenger seat by way of the adjustable headrest frame, and wherein the headrest cushion comprises a support surface disposed for facing away from the headrest frame, the support surface comprising a concave upper part and a convex bottom part relative to the passenger seat.

The headrest cushion can comprise voids formed in a body thereof, the voids being aligned with respective folding joints of the adjustable headrest frame for folding side portions of the headrest frames relative to a mid-portion of the headrest frame. The headrest cushion can comprise a mid-portion having a first compressive strength, and side portions having a second compressive strength different from the first compressive strength. The first compressive strength can be higher than the second compressive strength. The mid-portion of the headrest cushion can be configured for mounting to a center mounting plate of the adjustable headrest frame. The side portions of the headrest cushion can be configured for mounting to respective side mounting plates of the adjustable headrest frame.

In one embodiment, the concave upper part of the support surface directly meets the convex bottom part of the support surface such that a cross-section of the headrest cushion along a vertical axis relative to the passenger seat is substantially reverse S-shaped. The curvature of the concave upper part can be shallower than the curvature of the convex lower part. The concave upper part and the convex bottom part can each extend substantially across the horizontal width of the headrest cushion relative to the passenger seat.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A headrest structure for a passenger seat, the headrest structure comprising:
   an adjustable headrest frame for connection to a passenger seat; and
   a headrest cushion mounted to the adjustable headrest frame such that the headrest cushion is moveable relative to a seat back of the passenger seat by way of the adjustable headrest frame;
   wherein the headrest cushion comprises cutouts formed in the support surface, the cutouts being aligned with respective folding joints of the adjustable headrest frame for folding side portions of the headrest frames relative to a mid-portion of the headrest frame;
   wherein the adjustable headrest frame is configured for providing forward and backward tilt such that a top of the adjustable headrest frame and a bottom of the adjustable headrest frame move in different horizontal directions relative to their respective positions in an upright orientation of the adjustable headrest frame, and
   wherein the headrest frame comprises a hinge element connected with a first end thereof at a fixed location on the headrest frame and with a second end thereof to a mounting brace for connection of the headrest frame to the passenger seat in an upward and downward moveable manner.

2. The headrest structure as claimed in claim 1, wherein the headrest cushion comprises a mid-portion made from a softer material compared to side portions of the headrest cushion.

3. The headrest structure as claimed in claim 2, wherein the mid-portion of the headrest cushion is mounted to a center mounting plate of the adjustable headrest frame.

4. The headrest structure as claimed in claim 2, wherein the side portions of the headrest cushion are mounted to respective side mounting plates of the adjustable headrest frame.

5. The headrest structure as claimed in claim 1, wherein the support surface includes a concave upper part and a convex bottom part, and wherein the concave upper part of the support surface directly meets the convex bottom part of the support surface such that a cross-section of the headrest cushion along a vertical axis relative to the passenger seat is substantially reverse S-shaped.

6. The headrest structure as claimed in claim 5, wherein the curvature of the concave upper part is shallower than the curvature of the convex lower part.

7. The headrest structure as claimed in claim 5, wherein the concave upper part and the convex bottom part each extend substantially across the horizontal width of the headrest cushion relative to the passenger seat.

8. The headrest structure as claimed in claim 1, wherein the adjustable headrest frame comprises a 4-way headrest frame for allowing upward and downward movements, as well as folding to provide sideway head support.

9. The headrest structure as claimed in claim 1, wherein the adjustable headrest frame comprises a 6-way headrest frame for allowing upward and downward movements, folding to provide sideway head support and forward and backward tilt.

10. The headrest structure as claimed in claim 9, wherein the headrest frame is configured such that the headrest cushion is moveable in upward and downward directions, in forward and backward tilt, and folding along two fold lines.

11. A passenger seat comprising a headrest structure as claimed in claim 1.

12. The headrest structure of claim 1, wherein the adjustable headrest frame is configured for providing forward and backward tilt such that an axis of rotation for the forward and backward tilt is disposed at about ¼ of the height of the adjustable headrest frame below the top of the adjustable headrest frame.

13. The headrest structure of claim 1, wherein the adjustable headrest frame is configured for providing forward and backward tilt such that a distance of movement in a forward direction of the bottom of the adjustable headrest frame is larger than a distance of movement in a backward direction of the top of the adjustable headrest frame during backward tilting from the upright orientation of the adjustable headrest frame.

* * * * *